Jan. 16, 1968     F. J. DEAN, JR     3,363,536
THERMOSTATIC CONTROL ASSEMBLY FOR AIR
CONDITIONING SYSTEMS
Filed Oct. 10, 1966     2 Sheets-Sheet 1
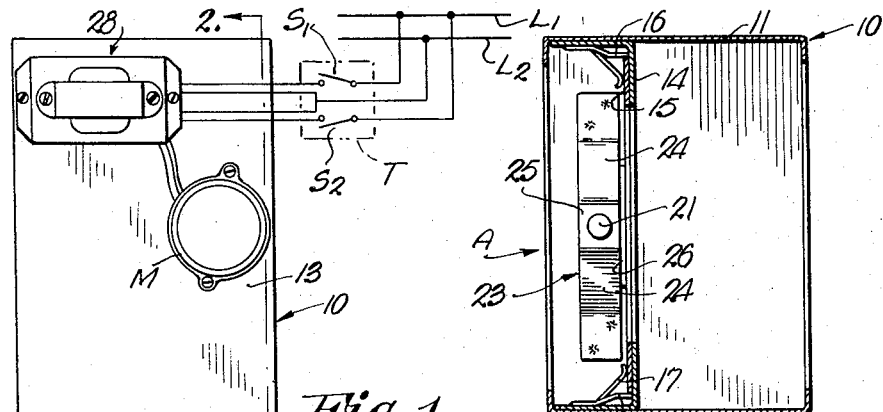
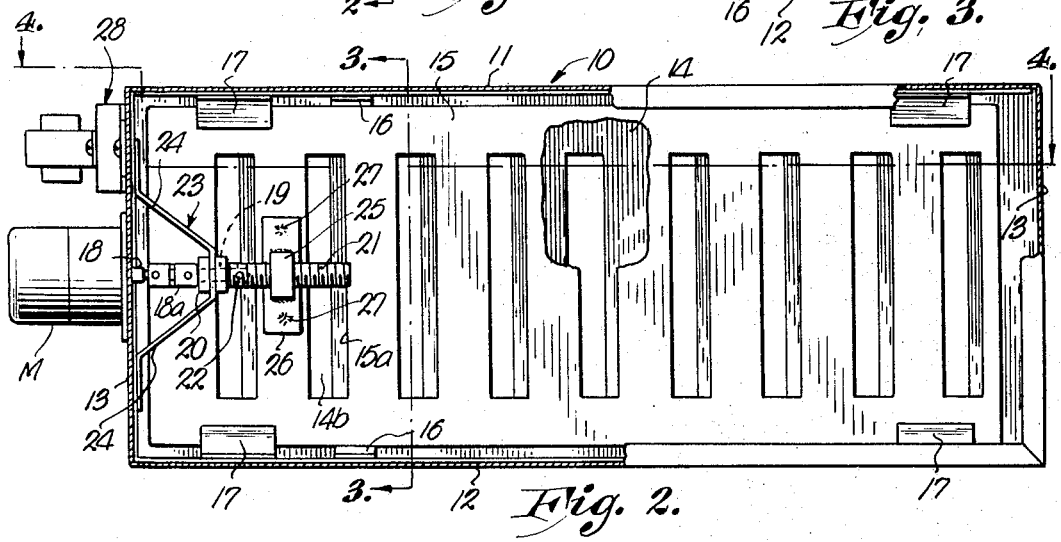
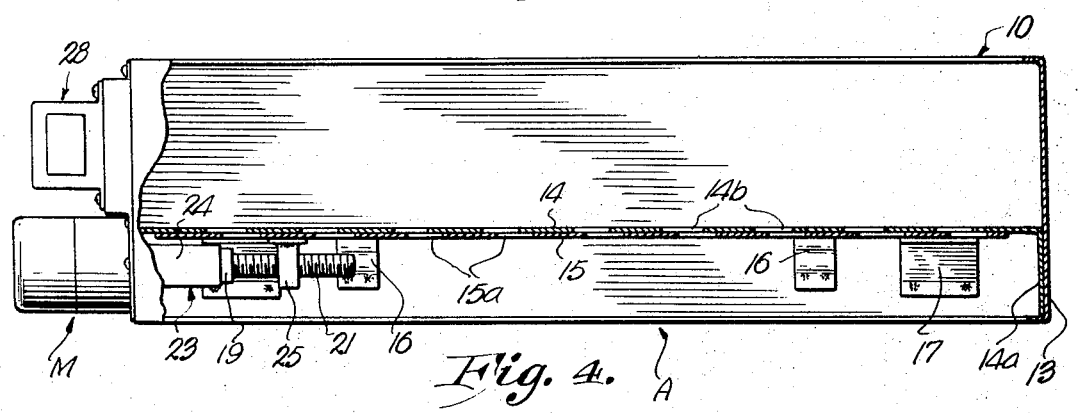
INVENTOR.
Frank J. Dean, Jr.
BY
Scofield, Kokjer, Scofield & Lowe
ATTORNEYS.

Jan. 16, 1968    F. J. DEAN, JR    3,363,536
THERMOSTATIC CONTROL ASSEMBLY FOR AIR
CONDITIONING SYSTEMS
Filed Oct. 10, 1966    2 Sheets-Sheet 2
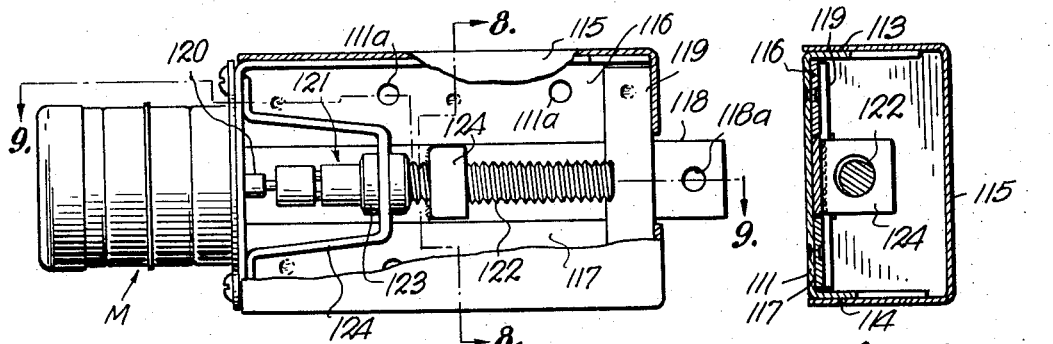
*Fig. 7.*  *Fig. 8.*
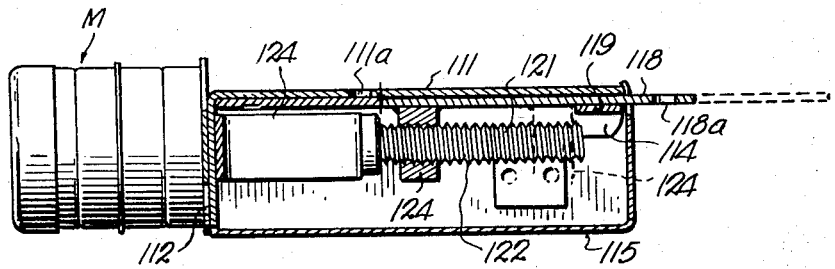
*Fig. 9.*
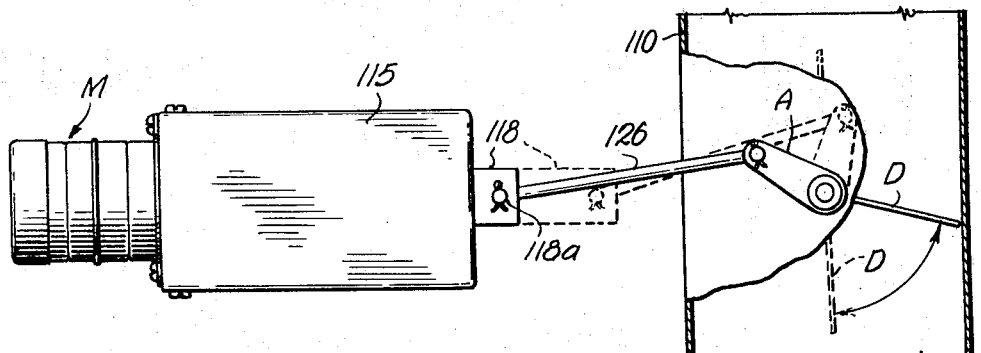
*Fig. 5.*
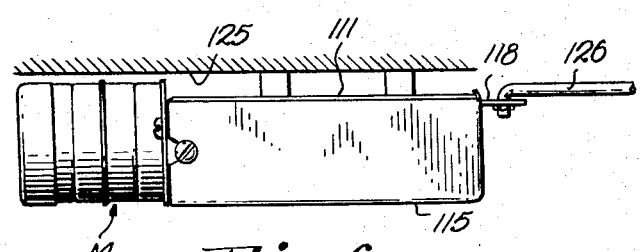
*Fig. 6.*
INVENTOR
Frank J. Dean, Jr.
BY Scofield, Kohjer, Scofield & Lowe
ATTORNEYS

United States Patent Office 3,363,536
Patented Jan. 16, 1968

3,363,536
THERMOSTATIC CONTROL ASSEMBLY FOR AIR CONDITIONING SYSTEMS
Frank J. Dean, Jr., Jackson, Mo., assignor to Tempmaster Corporation, a corporation of Missouri
Continuation-in-part of application Ser. No. 420,620, Dec. 23, 1964. This application Oct. 10, 1966, Ser. No. 594,640
2 Claims. (Cl. 98—41)

ABSTRACT OF THE DISCLOSURE

A flow control damper in an air duct is connected by means of a screw thrust arrangement with the output shaft of a high speed, low torque reversible electric motor. The screw thrust arrangement includes a rigidly supported thrust bearing between the output shaft of the motor and the screw and a universal joint is provided in the output shaft.

---

This application is a continuation-in-part of my co-pending application Ser. No. 420,620, filed Dec. 23, 1964, and now abandoned.

This invention deals generally with high velocity air distribution systems employed in heating and air conditioning buildings, and refers more particularly to a thermostatically responsive damper control arrangement in such a system.

One of the principal objects of the invention is to provide an arrangement which has two principal advantages over those with which I am presently familiar: (1) the power required for shifting of the damper between more open and more closed positions is held to an extremely low value and (2) the changes in downstream conditions are achieved slowly enough that there is infrequent cycling on and off of the thermostatic control, i.e. the change in temperature occasioned by further opening or shutting down of the damper assembly is gradual rather than rapid, thus adding greatly to the over-all comfort effect achieved by the system.

A further object of the invention is to provide an air flow damper control for thermostatic operation which is efficient and reliable in its performance and yet can be produced and installed at a very low cost.

Still another object of the invention is to provide a control arrangement in which a low torque, high speed electric motor input can be utilized to effect position shifting of the damper means without damage to the motor.

A further object of the invention is to provide an electrically powered operating mechanism which is capable of connection with various types of flow control units and which can be produced as an integral device suitable for facile connection with such units.

Other and further objects of the invention together with the features of novelty appurtenant thereto will appear in the course of the following description.

In the accompanying drawings, which form a part of the specification and are to be read in conjunction therewith, and in which like reference numerals indicate like parts in the various views;

FIG. 1 is an end elevational view of a damper assembly made in accordance with one preferred form of the invention, a thermostat being shown in diagrammatic form in association therewith;

FIG. 2 is a sectional view taken along line 2—2 of FIG. 1 in the direction of the arrows;

FIG. 3 is a sectional view taken along the line 3—3 of FIG. 2 in the direction of the arrows;

FIG. 4 is a sectional view taken along line 4—4 of FIG. 2 in the direction of the arrows;

FIG. 5 is a side elevational view of a modified form of the invention, showing the control means connected with a butterfly type damper in a control duct;

FIG. 6 is a partial top plan view of the arrangement shown in FIG. 5, the duct and damper not being shown;

FIG. 7 is an enlarged side elevational view of the control device per se, part of the outer housing being broken away for purposes of illustration;

FIG. 8 is a sectional view taken along line 8—8 of FIG. 7 in the direction of the arrows; and FIG. 9 is a sectional view taken along the line 9—9 of FIG. 7 in the direction of the arrows.

Referring to the drawings, and initially to FIGS. 1–4, inclusive, reference numeral 10 indicates generally, a duct-like section of rectangular cross section through which conditioned air is to be flowed from a source (not shown). The section 10 has top wall 11, bottom wall 12, and side walls 13. The section 10 can conveniently be a portion of an attenuator or discharge unit of the nature disclosed in my abandoned application Ser. No. 104,640, filed Mar. 7, 1956, now abandoned. The air flow through the duct section is generally in the direction indicated by arrow A in FIGS. 2 and 4.

Located within the duct section 10 and filling the internal cross-section thereof is a stationary baffle member 14 which is substantially normal to the flow of the air. Preferably this member comprises a rectangular sheet having end flanges at the opposite ends as shown at 14a in FIG. 4, which are spot welded or otherwise firmly secured to the ends 13 of the duct section. The baffle member 14 is provided with a plurality of spaced vertically elongated rectangular opening 14b through which, when uncovered, air can flow.

Positioned adjacent one face of the baffle member 14 is a cooperating movable baffle member 15 having a pattern of openings 15a similar to those of the member 14. The member 15 is adapted to be reciprocated longitudinally between a position in which the openings 15a are in full registry with and uncover openings 14b, which is the full open position for the damper assembly, and a position in which the openings 15a are completely covered by the intermediate sheet portions of member 14 located between the openings 14b therein. A movable baffle member is shown in FIGS. 2 and 4 as being substantially one-fourth closed or alternatively, three-quarters open.

The movable baffle member 15 is supported for reciprocating movement by a system of eight tab members secured to the top and bottom walls of the duct section. Four symmetrically arranged tabs 16 are positioned to slidably engage the upper and lower edges of the baffle member 15, two spaced along each of said edges. Four somewhat larger tabs 17 have bent tip portions which cooperate with the baffle member 14 to hold the baffle member 15 against the member 14 and to confine the movement of baffle member 15 to a substantially fixed plane parallel with and adjacent to the stationary baffle member 14.

The shifting of the baffle member 15 between the open and closed positions is accomplished through the combination of thermostat T, a two-way synchronous motor M and the transmission and screw assembly subsequently to be described.

The motor M, which is a low horse-power, low torque, reversible synchronous motor of conventional structure, is mounted on a side wall 13 of the duct section so that its shaft 18 extends into the duct section through an appropriate opening (not shown) in the wall. The shaft 18 is coupled with a universal joint 18a, the other end of which connects with a continuing shaft 19 which extends through a thrust bearing 20. The shaft 19 is received within a counterbore formed in a screw 21 and is pinned therein by the diametric pin 22.

The bearing 20 is carried by a bracket structure 23 having the diverging legs 24 which are firmly secured at their ends to the inside of the duct wall 13, as for example, by spot welding. The bracket 23 is a substantially rigid structure. The thrust bearing 20 is designed to prevent any longitudinal movement of shaft 19 therein.

The screw 21 is threadedly engaged with a complementary nut 25 which is secured firmly to the movable baffle member 15. In the illustrated embodiment, the nut is welded to a plate 26, which in turn is spot welded as at 27 to the face of the baffle member. Obviously, rotation of screw 21 about its axis will cause longitudinal displacement of the baffle member 15 in response thereto, the direction of displacement depending upon the direction of rotation of the screw. The threads on the screw are extremely low pitch so that for each revolution of the screw there will be only a modest increment of longitudinal displacement.

The motor M is controlled by the thermostat T which as illustrated is a two-switch unit having the upper thermally actuated switch $S_1$ and the lower thermally actuated switch $S_2$. For purposes of illustration, switch $S_1$ will be considered as the one designed to close when more air is demanded and switch $S_2$ when a reduction in quantity of air is required. Both switches are of the type that remain closed until the demand condition has been satisfied at which time they reopen. It will be understood that in referring to increasing or decreasing the air flow, what is actually being dealt with is a variation in heat load. However, inasmuch as the present damper is designed principally for use with a constant temperature air supply it is more convenient to discuss the invention in terms of air quantities.

The switches $S_1$ and $S_2$ are interposed in conductor lines leading from the power lines $L_1$, $L_2$. The conductors are connected through the transformer 28 with the motor M.

In assembling the unit, the direction of rotation of the motor M is so correlated with switches $S_1$ and $S_2$ that upon closing switch $S_1$, the direction of rotation of the motor is such as to turn screw 21 in a direction to increase the area open to flow through the damper elements. Consequently, the closing of switch $S_2$ results in the counter-rotation and in displacement of the baffle member in the direction to reduce the area open to flow. In operation, whenever the conditions in the enclosure in which the thermostat is located are such as to call for more air, switch $S_1$ will close. Consequently, the motor M will be energized and rotation of screw 21 commenced. Due to the provision of the rigid bracket 23 and thrust bearing 20, all of the thrust load imposed on the screw by resistance to movement of the movable baffle will be absorbed in the bracket structure and no actual load imposed on the motor shaft 18. It will also be noted that due to the provision of the universal joint it is not required that the thrust bearing have an accurate alignment with the motor shaft. Both of these factors make it possible to utilize a very low horsepower, lower power requirement motor.

The low pitch of the threads on the screw provides for a very slow displacement of the movable baffle member 15 and consequently there will not be a rapid change of condition in the room. Rather the change is gradual and will normally be undetectable in the sense of having a sensation of immediate change. This is all to the good in any air conditioning system.

In the event that less air is called for than is being supplied at any given setting, switch $S_2$ will close, thus rotating the screw 21 in a direction to move the baffle member 15 to the right. This causes the area open to flow to reduce even further in cross-section, thus decreasing air flow. Naturally, when the required condition has been met as sensed by the thermostat, switch $S_2$ will open and the baffle assembly remain inactive until further change is reflected at the thermostat.

In FIGS. 5 through 9, I have shown a modified form of the invention in which the control device itself is arranged for mounting separate from the damper mechanism and has an operating member which can be connected through suitable linkage with various types of flow control means. For purposes of illustration, I have shown the control device connected with the arm A of a pivotal butterfly damper D which is supported within and controls the flow of air through a duct 110.

As in the preceding embodiment, the unit includes a reversible motor M. The transformer and thermostat associated with the motor have not been shown in conjunction with this modification, but it will be understood that the arrangement is substantially the same as in the preceding embodiment. The motor is supported at one end of a base plate member 111, the motor being mounted on the outturned flange 112 thereof. The base plate 111 also has outturned upper and lower flanges 113, 114. A removable cover 115 fits over and to the outside of the flanges 113, 114.

Secured to the inside face of the base plate 111 are elongate rectangular spacers 116, 117, which define between their confronting edges a channel or guideway within which is slidably supported an elongate rectangular operating bar 118. A retainer bar 119 overlies bar 118 near that end of the device opposite the motor M and has its ends secured to the respective spacers. This retaining bar serves to retain the operating bar within the guideway. The bar projects beyond the end of the base plate 111 through an opening provided in the end wall of the housing 115. The projecting end of the guide bar is provided with an aperture 118a.

The shaft 120 of the motor M extends through an appropriate opening in flange 112 and is coupled with a universal joint 121, the other end of which, as in the preceding embodiment, connects with a shaft extending into and secured to the screw 122. The shaft connecting the universal joint with the screw is not shown, but is rotatably carried in the thrust bearing 123, which in turn, and as in the earlier embodiment, is supported by the bracket structure 124, whose ends are supported on and secured to the end flange 112 by welding or otherwise.

Again, as in the preceding embodiment, the screw 122 operates in response to operation of the motor M to reciprocate a nut 124. The nut in turn is secured to the operating member 118. Rotation of the motor in one direction will extend the member, while rotation in the other direction will retract the operating member.

The plate 111 is provided with mounting holes 111a for receiving mounting screws (not shown) by which it can be screwed to any supporting surface such as the one schematically illustrated at 125 in FIG. 6.

The operating member 118 is connected with the arm A by a connecting link 126, the link having bent ends which are received in the respective apertures in the crank arm A and the operating members are retained therein by cotter pins. Obviously, as the motor is actuated in response to the thermostat and in the manner earlier described, the slide 118 will serve through link 126 to pivot the damper D and open or close it as the situation may require.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

Inasmuch as various possible modifications of the invention may be made without departing from the scope thereof, it is to be understood that all matter herein set forth or shown in the accompanying drawings is to be interpreted as illustrative and not in a limiting sense.

Having thus described my invention, I claim:

1. In a flow control structure for air conditioning systems, the combination including,
   a duct,
   a movable flow control member supported inside said duct,
   a reversible electric motor having an output shaft,
   stationary mounting means for said motor adjacent said duct,
   a linear thrust screw,
   a universal joint interconnecting said output shaft and and screw for causing rotation of the screw in response to rotation of said shaft,
   support means for said screw operable to absorb and transmit thrust loads from said screw to said mounting means, said support means comprising a bracket secured to and extending from said mounting means and a thrust bearing carried by said bracket, said thrust bearing interposed between said screw and motor output shaft, and
   a nut engaged by said screw, said nut connected with said flow control member and displaceable lengthwise of said screw upon rotation of the latter by said motor whereby to move said flow control member.

2. The combination as in claim 1,
   a pair of cooperating apertured plate members disposed in said duct adjacent one another and substantially filling the cross section of said duct, one of said plate members being said movable control member and supported for reciprocating movement transversely of the duct relative the other plate member, said plate members respectively supplied with alternating openings and closure portions which cooperate to increase and decrease the area open to flow in response to movement of said one plate member.

References Cited
UNITED STATES PATENTS

| | | | |
|---|---|---|---|
| 2,113,207 | 4/1938 | Yingling | 236—49 |
| 2,936,692 | 5/1960 | White | 98—32 |

ROBERT A. O'LEARY, *Primary Examiner.*

W. E. WEYNER, M. A. ANTONAKAS,
*Assistant Examiners.*